April 23, 1968  K. FREDERICK ETAL  3,379,346
DISPENSING APPARATUS FOR HOLLOW NESTED ARTICLES
Filed July 28, 1966  4 Sheets-Sheet 1

Inventors
Kenneth Frederick
Leo Strombeck
By McCanna, Morsbach & Pillote
Attys

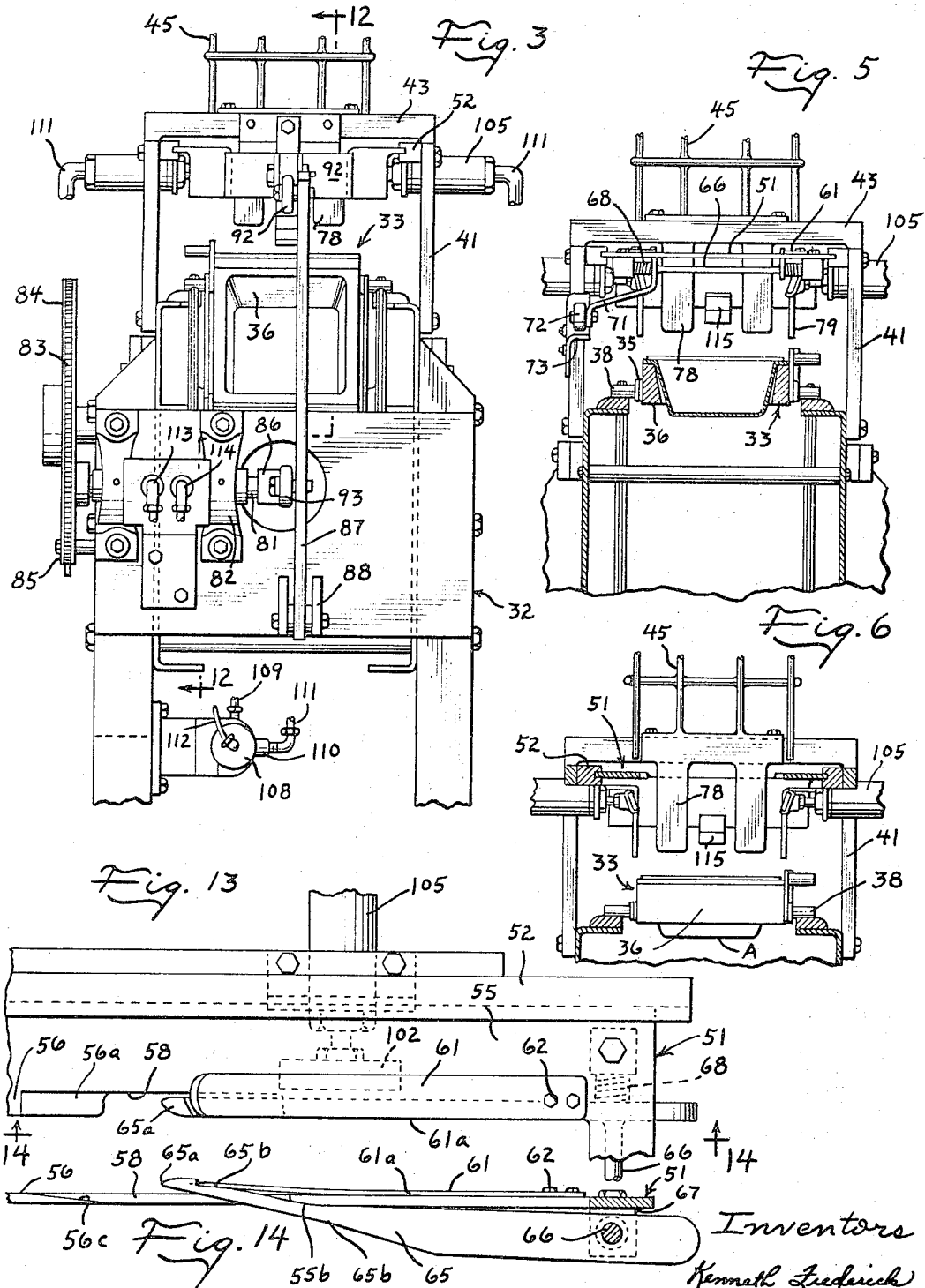

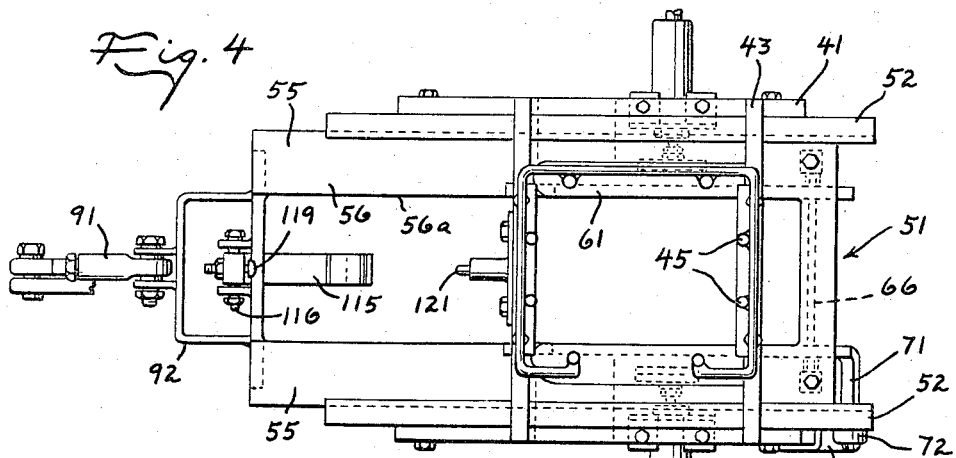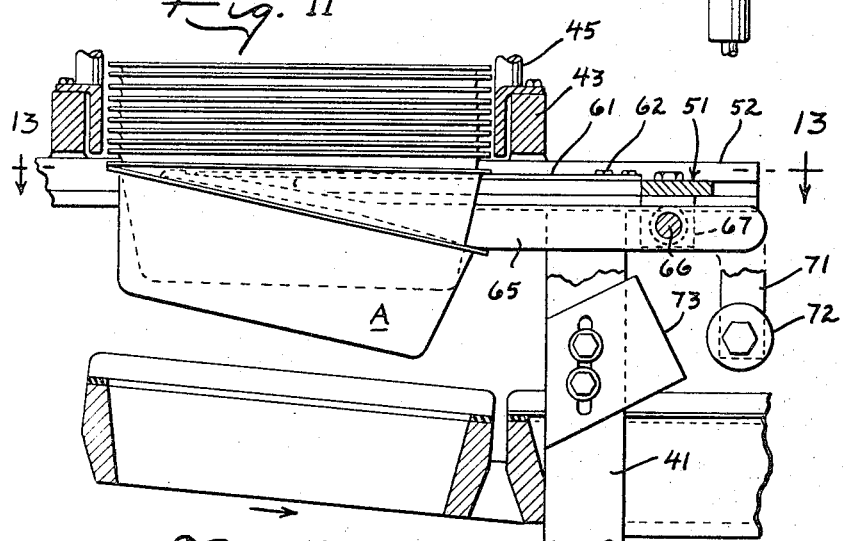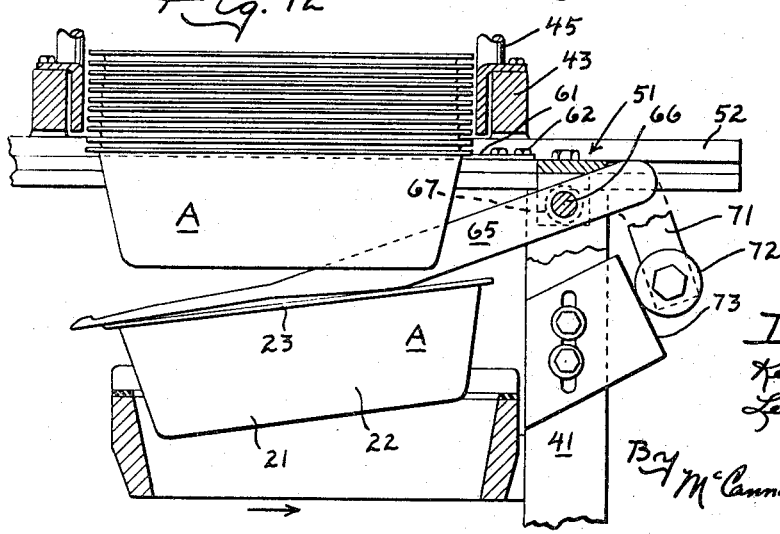

Inventors
Kenneth Frederick
Leo Strombeck
By McCanna, Morsbach & Pirrto
Attys

United States Patent Office 3,379,346
Patented Apr. 23, 1968

3,379,346
DISPENSING APPARATUS FOR HOLLOW NESTED ARTICLES
Kenneth Frederick, Davis Junction, and Leo Strombeck, Rockford, Ill., assignors to Anderson Bros. Mfg. Co., Rockford, Ill., a corporation of Illinois
Filed July 28, 1966, Ser. No. 568,609
9 Claims. (Cl. 221—224)

ABSTRACT OF THE DISCLOSURE

An apparatus for dispensing nested articles from a stack onto a conveyor in which a slide has support ledges underlying the flanges on the end article in one position of the slide, and the slide is moved in timed relation with the conveyor to a second position in which article strippers on the slide move laterally of the stack between the flanges on the end article and the penultimate article and then move downwardly to press the end article off the stack and into the conveyor path. A denester is operated in timed relation with the operation of the slide to grip the sides of the end article, press the bottom of the end article upwardly to produce an initial separation of the flanges on the penultimate article from those on the end article prior to movement of the article stripper therebetween.

---

This invention relates to improvements in apparatus for dispensing articles from a nested stack.

In the dispensing of nested articles, it is common practice to insert a stripping member between the edge of the end article and the adjacent nested article to separate the end article from the stack. Difficulties, however, have been encountered in dispensing some types of articles with such apparatus, particularly articles formed of thin plastic material. It has been found that even when an article stripper is inserted between the edge of the end article and the adjacent nested article, some articles may not immediately be dispensed from the stack but instead remain suspended momentarily or even fail to drop altogether. When the dispensing apparatus is operated in conjunction with a cyclically operating machine such as a filling machine, even a short delay in dropping the container can disrupt the cyclic operation of the machine. Thus, when the dispenser is arranged to dispense the articles onto a moving conveyor, even a momentary delay in dropping of the article will cause improper positioning of the article on the conveyor. It is presently believed that the delay in dropping of certain articles, such as those formed of thin plastic material during dispensing from the nested stack, is due to static charges on the articles which tend to attract the articles as they are dispensed from he stack and prevent proper dropping of the same.

An important object of this invention is to provide an apparatus for dispensing nested articles which will reliably dispense the articles from a nested stack.

A more particular object of this invention is to provide an article dispensing apparatus capable of dispensing nested articles formed of thin plastic material.

Another object of this invention is to provide an apparatus for dispensing nested articles from a stack onto a conveyor having spaced article engaging elements which will reliably dispense the articles and accurately position the dispensed articles on the conveyor.

Yet another object of this invention is to provide an apparatus for dispensing nested articles which is simple in construction and reliable in operation.

These, together with other objects and advantages of this invention, will be more readily appreciated as the invention becomes better understood by reference to the following detailed description when taken in connection with the accompanying drawings, wherein:

FIG. 3 is an end elevational view of the machine and article dispenser of FIG. 1;

FIG. 4 is a top plan view of the article dispenser;

FIG. 5 is a fragmentary transverse sectional view taken on the plane 5—5 of FIG. 2;

FIG. 6 is a fragmentary transverse sectional view taken on the plane 6—6 of FIG. 2;

FIGS. 11 and 12 are fragmentary longitudinal sectional views through the dispensing apparatus and illustrating the same in different operative positions;

FIG. 13 is a fragmentary view taken on the plane 13—13 of FIG. 11; and

FIG. 14 is a fragmentary vertical sectional view taken on the plane 14—14 of FIG. 13.

Figure 1:
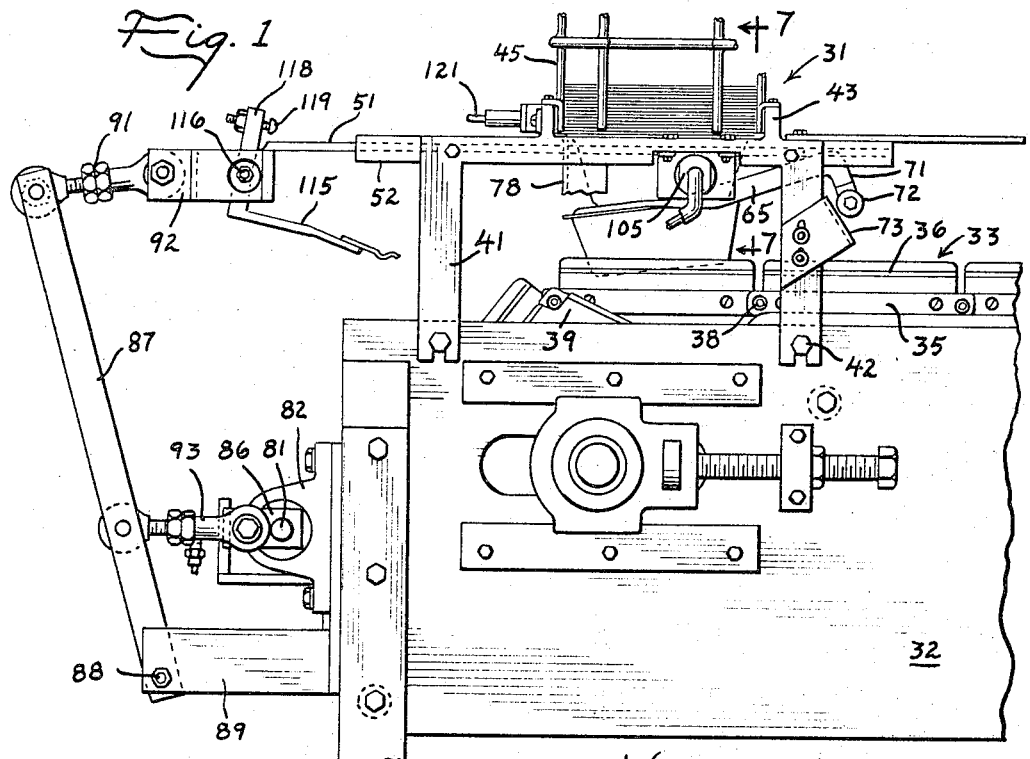
FIGURE 1 is a fragmentary side elevational view of a machine embodying the present invention.

The article dispensing apparatus of the present invention has an improved arrangement for stripping the end article from a stack of nested articles to assure reliable dispensing of the same and is advantageously used in conjunction with an article conveyor to accurately feed and position the dispensed article on the conveyor. The dispensing apparatus of the present invention is particularly designed for use in conjunction with a denesting apparatus of the type disclosed in the patent to Strombeck, No. 3,243,076, and is herein disclosed and described in conjunction with such a denesting apparatus. The denesting apparatus disclosed in the aforementioned patent is designed for use with closely nested articles and is arranged to effect an initial separation of the end article from the adjacent nested article in the stack and, while the dispensing apparatus of the present invention achieves its fullest utility in conjunction with such an apparatus, it is to be understood that the dispensing apparatus of the present invention is generally adapted for dispensing nested articles so long as the article strippers can be inserted between the flanges on the end article and the penultimate article.

The apparatus of the present invention is generally adapted for use in dispensing articles of widely different size and shape including articles of the type commonly referred to as cup-shaped containers and dish-shaped containers, wherein the articles have lateral flanges at at least relatively opposite sides thereof. The apparatus is especially adapted for use in dispensing containers formed of thin and light-weight material which do not drop reliably when stripped from the nested stack and may, for example, be used to dispense articles formed of plastic material such as polyethylene, polystyrene, polypropylene, polyvinyl chloride, etc. A typical article A, herein shown in the form of a container, is illustrated in the drawings and includes a bottom wall 21, a side wall 22 extending around the bottom wall and preferably diverging slightly relative thereto to facilitate nesting of the articles, and an outwardly extending flange or rim designated 23 at at least relatively opposite sides of the article adjacent the free edge thereof.

The article dispensing apparatus of the present invention designated generally by the numeral 31 is specifically designed for use with a machine 32 such as a container filling machine, and which employs a conveyor mechanism 33 for advancing the dispensed articles from the dispensing mechanism sequentially past other instrumentalities such as a filling and/or sealing mechanism (not shown). As shown herein, the conveyor 33 includes a plurality of articulated links 35 and article receiving trays or pockets 36 attached to the links to receive the articles and accurately locate the same as they are advanced past the subsequent stations. As shown, the links are formed with laterally extending pins 38 entrained over drive sprockets 39 on the machine, and a means described hereinafter is provided for operating the article dispenser in timed relation with the movement of the conveyor to dispense articles into pockets on the conveyor. The conveyor itself can be driven from any suitable means (not shown), either continuously or intermittently. As shown, a single article dispenser is utilized, it being understood that several article dispensers could be employed if desired and arranged to dispense articles into alternate pockets as disclosed in the aforementioned patent.

The dispenser 31 is mounted by a support structure above the conveyor 33 and, as shown, this support structure includes generally U-shaped brackets 41 attached at their lower ends as by fasteners 42 to the machine adjacent opposite sides thereof. The brackets extend upwardly along opposite sides of the conveyor and have cross-pieces 43 extending therebetween at a level above the conveyor. A carton magazine including upwardly extending guide rods 45 is mounted on the cross-rails 43 and extends upwardly therefrom to receive a stack of nested articles.

Figure 2:
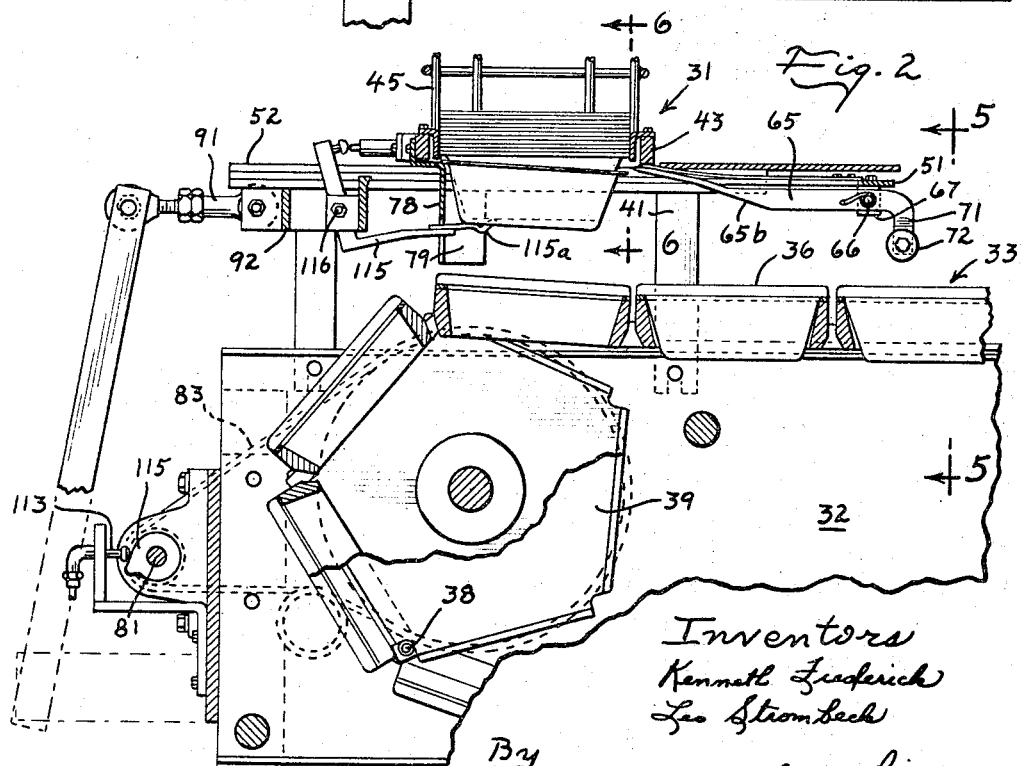
FIG. 2 is a fragmentary longitudinal sectional view through the machine and article dispenser of FIG. 1.
Figure 9:
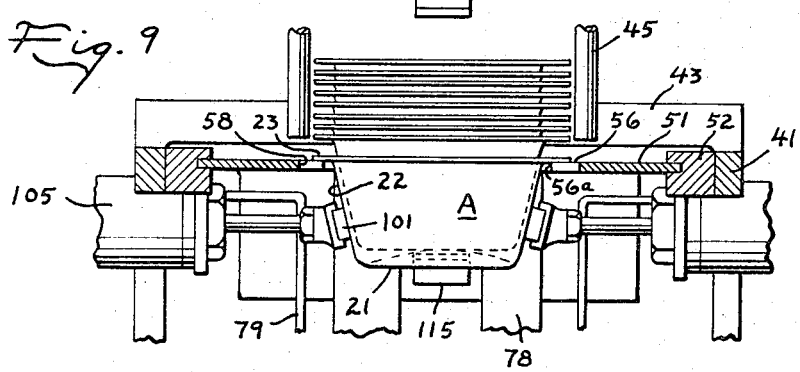

The dispensing mechanism 31 also includes a slide 51 mounted for movement in guide rails 52 attached to the brackets 41. The slide 51 is mounted for movement in a path crosswise of the lower end of the magazine and, as best shown in FIG. 4, the slide includes spaced side members 55 which are rigidly interconnected adjacent opposite ends to form a generally open framelike structure. The slide has means for supporting the stack of cartons when the slide is in one position thereof as shown in FIGS. 2 and 9. In particular, the side members 55 of the slide have ledge portions 56 (FIGS. 4, 9 and 13) which are adapted to underlie the flange 23 on the end article to support the same. As best shown in FIG. 9, the ledges 56 have their registering faces 56a spaced apart a distance to straddle the body portion of the article, and the ledges preferably have a length as shown in FIG. 4 which approximates the corresponding lengthwise dimension of the magazine (measured in a direction parallel to the path of movement of the conveyor) so as to underlie and support the flanges on opposite sides of the end article throughout substantially the length thereof.

The slide is movable from the position shown in FIGS. 2 and 9 to an extended position shown in FIGS. 1, 4, 7 and 12. In the extended position, the ledge portions 56 are completely withdrawn from below the magazine so as to disengage the flange on the end article. As best shown in FIG. 13, the side members 55 of the slide have an intermediate portion 58 wherein the adjacent faces of the side members are spaced apart a distance at least slightly greater than the transverse dimension of the articles measured across the flanges 23 thereof so as to allow the flanges to pass downwardly between the side members 55 of the slide as the slide is extended. A stripper means is mounted on the slide and is spaced in a direction longitudinally of the path of movement of the slide from the article support ledges 56. The stripper means is supported on the slide from movement therewith along a path such that the stripper means enters the spaces between the side flanges on the end article and the penultimate article as the slide is extended. In accordance with the present invention, the stripper means are mounted on the side members 55 of the slide at relatively opposite sides of the magazine and the stripper means each includes an upper flange engaging member adapted to underlie and support the side flanges on the penultimate article when the slide is extended. For reasons pointed out hereinafter, the upper flange engaging members 61 are advantageously made vertically resilient and, in the form shown, comprise a resilient strap best shown in FIGS. 13 and 14 which extends generally lengthwise of the path of travel of the slide and which has one end attached to the slide as by fasteners 62. As will be seen from FIG. 14, the resilient flange engaging members 61 overlie the upper face of the side members 55 so that the side members of the slide form a stop which limits downward movement of the resilient flange engaging members below the level of the top of the slide while permitting upward movement of the same.

The strippers at each side of the magazine also include a second or lower flange engaging member 65 which is adapted to engage the upper side of the flange on the end article to strip the end article off the stack as the slide is extended. It has been found in practice that passing a stripper between the flanges on the end article and the penultimate article does not always reliably dispense the end article from the stack and that there is sometimes a delay of variable duration between passing the stripper across the end article and the actual dropping of the same. This problem was particularly noted in connection with the dispensing of thin plastic articles and is believed to be due to static charges on the articles which tend to attract the article to the stack even after the stripper has passed between the flanges on the end article and the penultimate article. As is apparent, even a short delay in the dropping of the dispensed article could cause the article to be improperly positioned on the conveyor. The stripper apparatus of the present invention is arranged to positively move the end article off the stack a distance sufficient to overcome any attraction therebetween due to static charges and to positively move the dispensed article into the trays on the conveyor to assure proper positioning of the dispensed articles on the conveyor. For this purpose, the lower flange engaging members 65 are mounted for vertical movement between a raised position as shown in FIGS. 2, 11 and 14, and a lowered position as shown in FIGS. 1 and 12. The lower flange engaging members 65 are rigidly interconnected by a cross-shaft 66 and are pivotally mounted for movement about the axis of the cross-shaft on support blocks 67 attached to the slide. For reasons pointed out hereinafter, the mounting of the lower flange engaging members on the slide is made such that the pivot axis of these members is offset from one side of the magazine (herein sometimes referred to as the forward side of the magazine, that is the side of the magazine which faces in the direction of movement of the conveyor) in all operative positions of the slide and the lower flange engaging members extend rearwardly from the pivot aixs, that is in the direction opposite the direction of movement of the conveyor. The free end 65a of each of the lower flange engaging members is spaced in a direction lengthwise of the direction of movement of the slide from the article support ledges 56 on the slide and the free ends of the lower flange engaging members preferably extend to a level slightly above the level of the ledges as shown in FIG. 14, when the members 65 are in their raised position. Advantageously, the members 65 are notched as indicated at 65b at their upper sides to receive the free ends of the upper flange engaging members 61, when the lower flange engaging members are raised. The lower members are preferably yieldably urged to their raised position as by a coil spring or springs 68 and the side members 55 of the slide are shaped to form a stop 55b (FIG. 14) which engages the members 65 inwardly of the ends thereof to limit upward swinging movement. When in their raised position, the members 65 have their free ends disposed slightly above the top of the ledges 56 on the slide 51 and closely underlie the upper flange engaging members 61. The latter are resilient and can deflect slightly as shown in FIG. 14 to have their free ends extend in close juxtaposition to the lower flange engaging members. The underside of the lower flange engaging members is inclined downwardly as shown at 65b in the portion thereof that engages the flange on the end article when the slide is in its extended position to cam the end article downwardly as clearly shown in FIG. 11. The ends 56c of the ledges adjacent the strippers are preferably inclined downwardly as best shown in FIGS. 13 and 14 to facilitate passage of the side flanges on the end article downwardly between the ends of the support ledges and the underside of the lower stripping members when the slide is extended. A means is provided for swinging the lower flange engaging members 65 downwardly as the slide approaches its fully extended position to positively separate the lower article from the stack and to move the same into the article receiving trays on the conveyor. In the form shown, the lower flange engaging members 65 have an offset arm 71 and a follower 72 on the arm engageable with a stationary cam 73 on the support structure 41, as the slide approaches its fully extended position, to thereby move the lower flange engaging members from the raised position shown in FIG. 11 to the lowered position shown in FIG. 12.

The slide, during movement toward its extended position and stripping of the end container from the stack, advantageously moves in a direction opposite the direction of movement of the conveyor therebelow, and the lower flange engaging member is preferably arranged so that the free end thereof is disposed lower than the remainder of the member, when the member is in its lowered position as shown in FIG. 12. Thus, the lower flange engaging members press the articles downwardly to a level such that the body of the articles is engaged by the trailing side of the pockets on the conveyor and the conveyor, moving in the direction indicated by the arrows in FIGS. 11 and 12 can engage the dispensed container and advance the same even while the member 65 is in its lowered position. Downwardly extending article guide fingers 78 and 79 are preferably provided to extend downwardly from the rear end at relatively opposite sides of the magazine to facilitate guiding of the articles into the trays on the conveyor.

The slide is reciprocated in timed relation with the movement of the conveyor to dispense the articles into the trays or pockets on the conveyor. In the embodiment illustrated, a slide actuating shaft 81 is rotatably supported as by bearings 82 on the machine 32 and is driven as by a chain 83 from a sprocket 84 on the conveyor shaft to a sprocket 85 on the slide actuating shaft 81. The sprockets are preferably selected so as to drive the shaft 81 through one revolution as the conveyor moves through a distance corresponding to the center-to-center spacing of adjacent trays on the conveyor (when a single dispenser is used), and a crank 86 is provided on the shaft 81 for reciprocating the slide. As best shown in FIG. 1, a lever 87 has its lower end pivotally mounted at 88 on a bracket 89 attached to the machine 32 and the upper end connected through a link 91 to a bracket 92 secured to the slide to extend and retract the same in response to movement of the lever 87. A link 93 is provided for connecting the crank 86 to the lever 87 intermediate the ends thereof to extend and retract the same and, preferably, the links 91 and 93 are made longitudinally adjustable to enable adjustment of the stroke of the slide and the extended and retracted positions thereof.

As disclosed in the aforementioned Strombeck patent, No. 3,243,076, the flanges 23 on the end article are not always spaced uniformly or sufficiently from the flanges on the next adjacent article to permit insertion of the edge of the stripper therebetween. A denesting apparatus of the type disclosed in the aforementioned patent is accordingly advantageously provided for gripping the end container at the outer sides thereof and for thereafter pushing upwardly on the bottom of the end container to effect a partial separation of the flanges on the end container from the next adjacent container to produce an initial separation of the flanges sufficient to enable insertion of a stripper therebetween. For this purpose, a pair of article gripping members 101 is provided at opposite sides of the magazine and mounted for movement into and out of engagement with opposed sides of the end article. The gripping members are mounted on a head 102 and the gripper members are preferably inclined to correspond to the taper of the sides of the end article. Any suitable means such as the cam mechanism disclosed in the aforementioned patent may be provided for moving the gripper means into and out of engagement with the end article. In the present embodiment, fluid actuators 105 are mounted on the support structure and have their piston rods 106 connected to the heads to extend and retract the same. The fluid actuators 105 are conveniently of a type which are spring urged to a retracted position laterally away from the end article and are operated by fluid pressure into engagement with the opposite sides of the body portion of the end article. This is conveniently achieved by a pilot actuated valve 108 (FIG. 3) having an inlet 109 and a controlled outlet port 110 connected through lines 111 to the fluid actuators. The pilot controls for the valve 108 are connected through lines 112 to pilot valves 113 and 114 operated by cams 115 on the shaft 81 (see FIGS. 2 and 3). The air operated actuators 105 for moving the grippers will automatically equalize the pressures applied to relatively opposite sides of the end articles by the grippers 101 and, moreover, enable ready control of the pressure applied to the grippers as required for the particular type of article being dispensed, through control of the air pressure applied to the actuators.

When the gripper means 101 engages the side walls of the end article, they grip the end article therebetween and inhibit upward movement of the end article, and a presser member is provided for pressing the bottom wall of the end article inwardly to thereby tend to raise the superposed articles upwardly relatively to the end article. This article presser is conveniently in the form of an arm 115 pivotally mounted at 116 on the bracket 92 and having an article engaging finger 115a at its outer end. The arm 115 moves with the slide into and out of a position underlying the bottom of the end article in the stack, and a means is provided for moving the article presser upwardly into engagement with the bottom of the end article when the slide is retracted to the position shown in FIG. 2. As shown, an arm 118 rigid with the arm 115 extends upwardly from the pivot axis 116 and has an adjustable finger 119 arranged to engage a yieldable abutment 121 carried by the stationary support structure. The yieldable abutment operates to swing the arm 115 upwardly into engagement with the underside of the end article when the slide is retracted as shown in FIG. 2, and the abutment is yieldable slightly to minimize impact and to apply a yieldable upward pressure on the underside of the end carton.

The article gripping means 101 is preferably positioned as shown in FIG. 1 offset from the center of the magazine toward the forward side thereof to engage the end article at a point relatively closer to the forward side of the magazine, and the article presser 115 is arranged so as to engage the underside of the carton at a point relatively closer to the other or rear side thereof to tilt the end carton relative to the next adjacent carton. In particular, the grippers are arranged to engage the end article adjacent the side thereof from which the strippers enter and the presser engages the end article at the side thereof remote from the article strippers. This tilts the end carton as shown in FIG. 2 so as to provide a relatively wider gap between the flange on the end carton and the next adjacent carton, at the edge thereof closest to the article strippers as is illustrated in FIG. 2.

Figure 7:
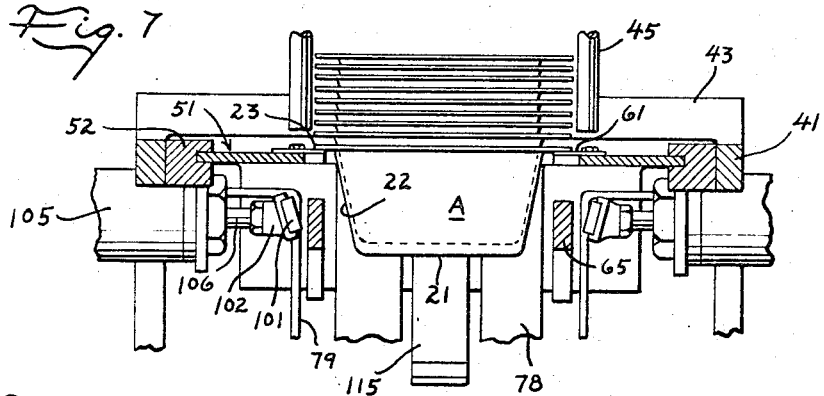
FIGS. 7–10 are fragmentary transverse sectional views taken on the plane 7—7 of FIG. 1 and illustrating the dispenser in different operative positions thereof.
Figure 8:
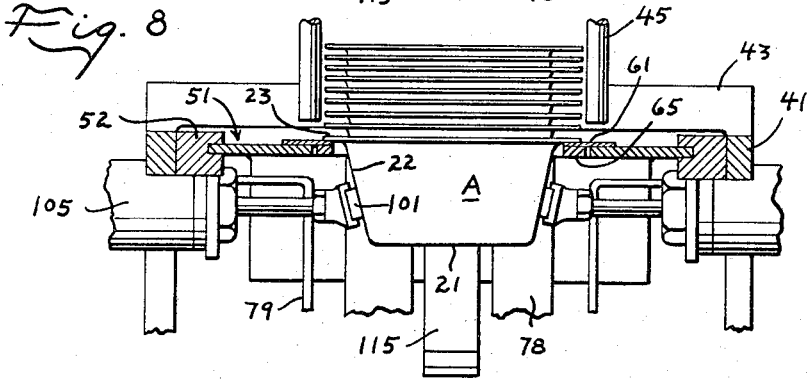
Figure 10:
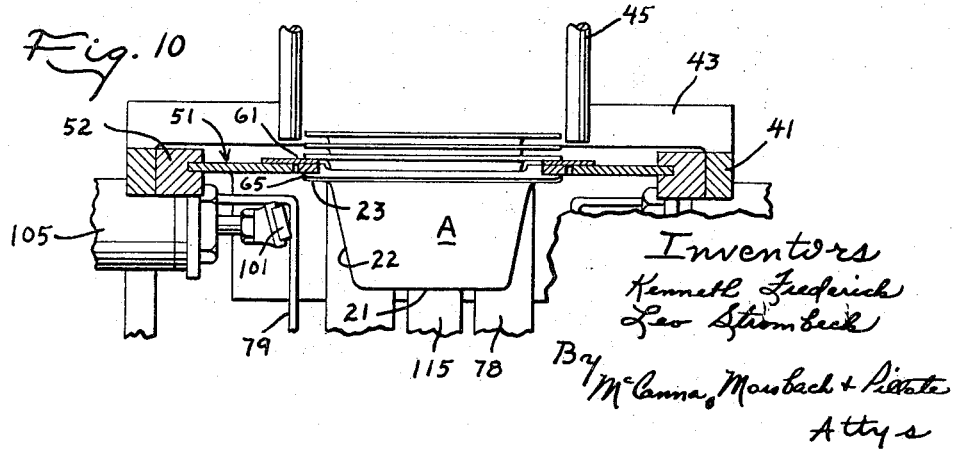

In operation, the slide is operated in timed relation with the movement of the conveyor from the retracted position shown in FIGS. 2 and 9 to the extended position thereof shown in FIGS. 1, 4, 7 and 12 and back to the retracted position. As the slide approaches its fully retracted position, the valve operating cams 115 operate the pilots 113, 114 to supply air to the gripper actuators 105 to move the grippers with the end article as shown in FIG. 9 and the presser arm 115 is thereafter moved upwardly to press the bottom of the end article inwardly as shown in phantom in FIG. 9 to shift the superposed articles relative to the end article. By reason of the offset relationship between the grippers and the article pressers, the end article is tilted somewhat relative to the next adjacent article to increase the spacing between the flanges of the end article and the penultimate article to the side adjacent the stripper. When the slide is in its retracted position, the ledges 56 on the slide underlie the flanges on the end container to support the same as shown in FIG. 9. As the slide is moved toward its extended position, these ledges are retracted from below the flange on the end container and the strippers then move into the space between the flange on the end container and the next adjacent container as shown in FIG. 10. During extension of the slide the upper flange engaging member 61 of the stripper underlies and supports the penultimate container while the lower flange engaging member 65 engages the upper side of the flange on the end container to cam the same downwardly as shown in FIG. 11. During the initial movement of the slide toward its extended position, the presser arm 115 is first moved downwardly away from the underside of the end container and the gripper actuating valve 108 is thereafter operated to release the gripper means after the strippers have entered the space between the end container and the next adjacent container. As the slide approaches its fully extended position shown in FIG. 12, the follower 72 on the lower flange engaging member 65 engages the cam 73 to swing the lower flange engaging member downwardly as shown in FIGS. 7 and 12. The members 65 press the end container downwardly sufficient to enter the tray on the conveyor so as to reliably and accurately position the tray in the conveyor. As the slide is thereafter moved toward its retracted position, the lower flange engaging members 65 move upwardly, the grippers move inwardly and the presser moves upwardly into engagement with the underside of the end article, in that sequence.

What is claimed as new is:

1. In an apparatus for dispensing hollow articles from a nested stack wherein the hollow articles are formed of a flexible material and have a bottom wall and side walls around the bottom wall and flanges extending outwardly from a pair of opposed side walls, said apparatus comprising a support structure, a magazine mounted on the support structure for receiving a stack of nested articles, a slide member mounted on the support structure for reciprocation along a path crosswise of the end of the magazine from a first position to a second position and back, said slide having first and second article support ledges disposed adjacent first and second sides of the magazine and laterally spaced apart to straddle the body portion and underlie the flanges on the end article in the stack to support the same when the slide is in said first position, said first and second article support ledges being movable with the slide out of underlying relation to the flanges on the end article when the slide is moved in one direction from said first position to said second position to allow dispensing of the end article from the stack, opposed article gripping means mounted on the support structure for movement laterally of the stack into and out of engagement with the outer faces of said opposed side walls of the end article in the stack, an article presser member mounted on the slide for movement into and out of engagement with the bottom wall of the end article in the stack, first and second article stripper means movable with the slide along first and second sides of the magazine in a path to pass between the flanges on the end article and the flanges on the penultimate article when the slide is in said one direction crosswise of the magazine from said first position to said second position, said stripper means each including an upper flange engaging member adapted to underlie the flange on the penultimate article when the slide is in said second position to support the penultimate article and a lower flange engaging member movable between a raised position underlying said upper member and a lowered position offset downwardly from said upper member, means operative when the slide is moved in a second direction from said second position back to said first position to move said article gripping means into engagement with the end article and to thereafter move said presser member into engagement with the bottom of the end article and operative when said slide is moved in said one direction to sequentially move said presser member out of engagement with the bottom of the end article and away from a position therebelow to allow dispensing of the end article, move said article gripper means away from said end article; and move said lower flange engaging member downwardly to positively separate the end article from the penultimate article.

2. An apparatus according to claim 1 including conveyor means below said magazine having spaced article engaging means for advancing dispensed articles along a path, and means for operating said slide in timed relation with said conveyor means, said lower flange engaging means when in said lowered position depressing said article into the path of said article engaging means on the conveyor means.

3. An apparatus according to claim 1 wherein said article presser member is arranged to engage the bottom of the end article at a point offset in said one direction from said article gripping means to tilt the end article relative to the penultimate article.

4. In a machine having article engaging means movable along a generally horizontal conveyor path for advancing dispensed articles, an apparatus for dispensing hollow articles from a nested stack having a body portion and flanges extending outwardly from opposite sides of the body portion, said apparatus comprising a magazine for receiving a stack of nested articles, a slide reciprocably mounted for movement along a slide path generally lengthwise of said conveyor path and across the lower end of the magazine between first and second positions, means for reciprocating said slide in timed relation with the movement of said conveyor means, said slide having first and second article support ledges disposed adjacent first and second sides of the magazine and laterally spaced apart to straddle the body portion and underlie the flanges on the end article to support the same when the slide is in said first position, said first and second article support ledges being movable with said slide out of underlying relation to the flanges on the end article when the slide is extended from said first position to said second position to allow dispensing of the end article from the stack, said slide having first and second article stripper means each having lead ends spaced in a direction lengthwise of said path from said first and second article support ledges and arranged with relation to said support ledges so as to pass along said first and second sides of the magazine between the flanges on the end article and the flanges on the penultimate article when the slide is extended along said slide path from said first position to said second position, said stripper means each including an upper flange engaging member adapted to underlie the flange on the penultimate article when the slide is in said second position to support said penultimate article and a lower flange engaging member swingably mounted on the slide for movement relative thereto about a generally horizontal axis extending crosswise of the conveyor path between a raised position underlying the upper member and a lowered position offset downwardly from the upper member to positively separate the end article from the penultimate article, and means for moving the lower flange engaging members downwardly to said lowered position after the slide is extended along said slide path away from said first position, said lower flange engaging members when in said lowered position depressing the article engaged thereby into the path of movement of the article engaging means on the conveyor means.

5. A machine according to claim 4 in which the pivot axis of the lower flange engaging members is offset from one side of the magazine in all operative positions of the slide and the lower flange engaging members extend from their pivot axis in the direction of movement of the slide during extension thereof.

6. A machine according to claim 4 wherein the upper flange engaging members are vertically resilient, said means for moving said lower flange engaging members including means yieldably urging the lower flange engaging members to said raised position in underlying engagement with the upper flange engaging members, and means for moving said lower flange engaging members downwardly as said slide is extended toward said second position.

7. A machine according to claim 5 wherein said slide when extended from said first position to said second position moves in a direction opposite the direction of movement of said article engaging means during advance of articles thereby.

8. A machine according to claim 7 wherein the lower flange engaging members have a cam portion at the underside thereof inclined downwardly from the lead ends of the article stripper means when the lower flange engaging members are in their raised position.

9. A machine according to claim 6 including means for limiting downward movement of said resilient upper flange engaging members to a level no lower than said first and second support ledges.

References Cited

UNITED STATES PATENTS

| | | | |
|---|---|---|---|
| 1,083,727 | 1/1914 | Claussen | 221—221 |
| 2,730,268 | 1/1956 | Moesch | 221—221 |
| 2,956,706 | 10/1960 | Austgen et al. | 221—221 |
| 3,034,683 | 5/1962 | Wilson | 221—221 |
| 3,243,076 | 3/1966 | Strombeck | 221—1 |

WALTER SOBIN, *Primary Examiner.*